(12) United States Patent
Shirakura et al.

(10) Patent No.: US 8,289,598 B2
(45) Date of Patent: Oct. 16, 2012

(54) IMAGE RECORDING METHOD, IMAGE RECORDING APPARATUS, AND IMAGE RECORDING MEDIUM

(75) Inventors: Akira Shirakura, Tokyo (JP); Yuji Nakagawa, Kanagawa (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 345 days.

(21) Appl. No.: 12/265,218

(22) Filed: Nov. 5, 2008

(65) Prior Publication Data

US 2009/0116087 A1    May 7, 2009

(30) Foreign Application Priority Data

Nov. 6, 2007    (JP) .................................. 2007-288327

(51) Int. Cl.
*G03H 1/26* (2006.01)
*G03H 1/10* (2006.01)
*G03H 1/04* (2006.01)
(52) U.S. Cl. ................. 359/23; 359/10; 359/35
(58) Field of Classification Search .................... 359/24, 359/23
See application file for complete search history.

(56) References Cited

U.S. PATENT DOCUMENTS 7,046,409 B2 * 5/2006 Kihara ............................. 359/23
7,479,354 B2 * 1/2009 Ueda et al. ........................ 430/1

FOREIGN PATENT DOCUMENTS

| JP | 6-266274 | | 9/1994 |
| JP | 09197109 A | * | 7/1997 |
| JP | 2002-530699 | | 9/2002 |

* cited by examiner

*Primary Examiner* — Jade R Chwasz
(74) *Attorney, Agent, or Firm* — Oblon, Spivak, McClelland, Maier & Neustadt, L.L.P.

(57) ABSTRACT

Recording an image of a holographic stereogram includes providing an optical deflecting device in proximity to a hologram recording medium that is exposed with a stripe-shaped elemental hologram. Either an object beam or a reference beam is deflected, in a long side direction thereof, through the optical deflecting device to expose the hologram recording medium. The hologram recording medium is multiply exposed, at least twice, with different deflection angles of the optical deflecting device to cause the stripe-shaped elemental hologram to have a plurality of parallaxes in a long side direction of the stripe-shaped elemental hologram.

18 Claims, 14 Drawing Sheets

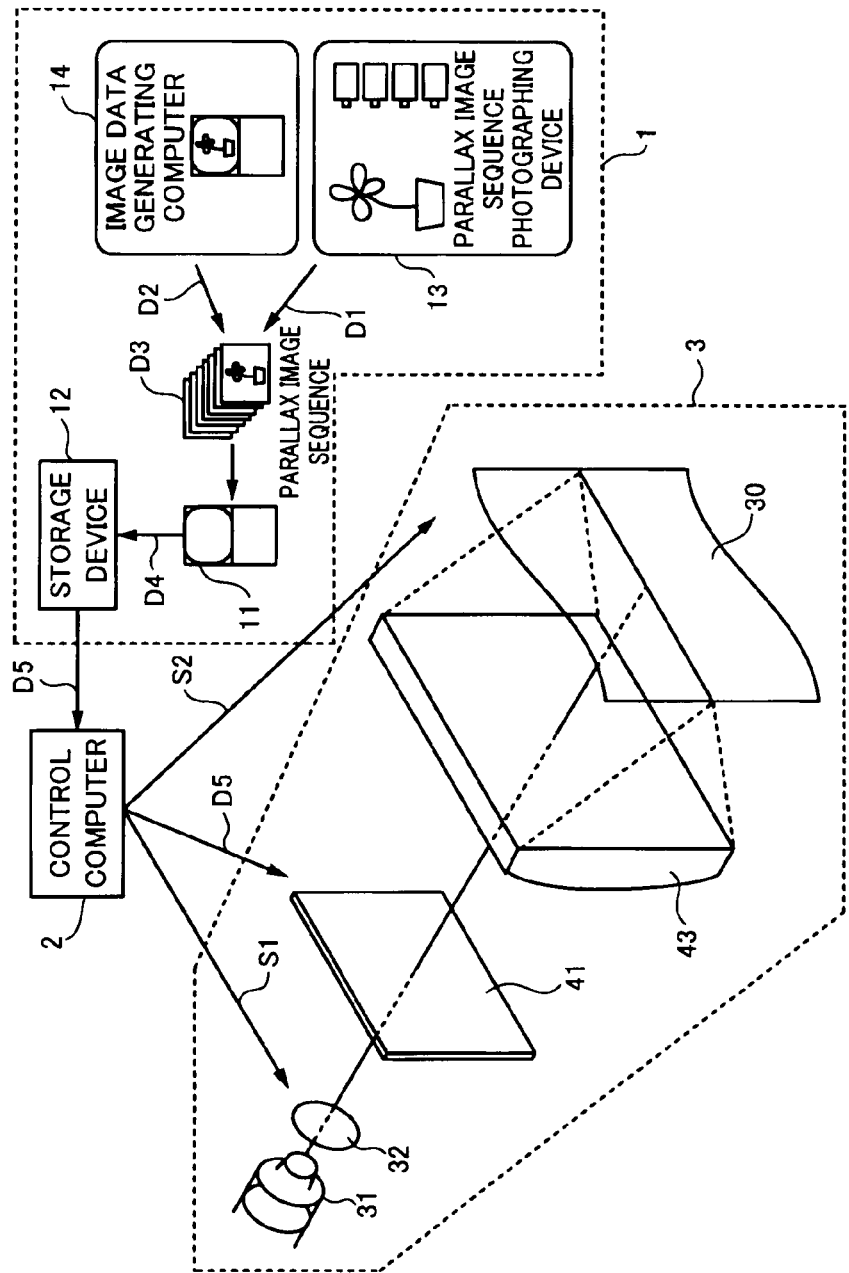

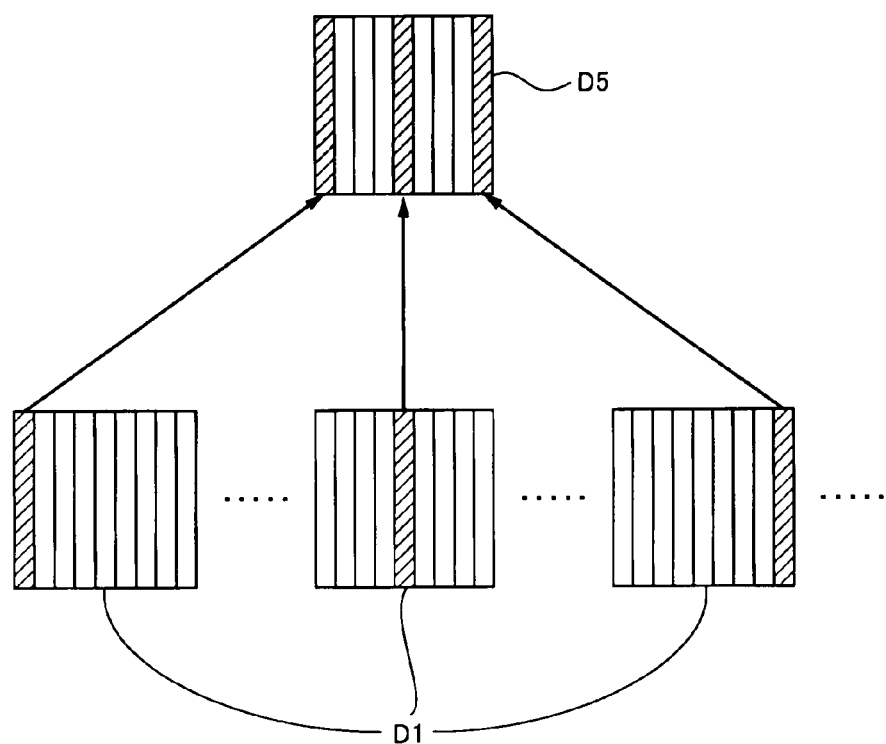

IMAGE RECORDING METHOD, IMAGE RECORDING APPARATUS, AND IMAGE RECORDING MEDIUM

CROSS REFERENCES TO RELATED APPLICATIONS

The present invention contains subject matter related to Japanese Patent Application JP 2007-288327 filed in the Japanese Patent Office on Nov. 6, 2007, the entire contents of which being incorporated herein by reference.

BACKGROUND OF THE INVENTION

1. Field of the Invention

The present invention relates to an image recording method and apparatus that produce holographic stereograms having parallaxes both in the horizontal (left and right) directions and vertical (upper and lower) directions and to an image record medium on which the holographic stereograms are recorded.

2. Description of the Related Art

A hologram of a three-dimensional image can be produced using two-dimensional original images of an object taken from different view points. A holographic stereogram is produced, for example, by successively recording many original images of which an object is taken from different observation points as stripe-shaped or dot-shaped elemental holograms on one hologram record medium.

As shown in FIG. 14, a holographic stereogram having parallax information only in the horizontal directions is produced, for example, by an image recording apparatus that records images of which a plurality of original images 101a to 101e of an object 100 successively taken from horizontally different observation points have been processed as stripe-shaped elemental holograms to a record medium 102.

In this holographic stereogram, image information obtained by successively taking an object from different horizontal observation points is successively recorded as horizontally stripe-shaped elemental holograms. Thus, when the user watches the holographic stereogram with both his or her eyes, two-dimensional images that he or she watches with his or her eyes slightly differ. Thus, the user feels parallaxes with the images and watches them as a three-dimensional image. In the following, holographic stereograms may be simply referred to as holograms.

As described above, when stripe-shaped elemental holograms are recorded, a horizontal parallax only (HPO) holographic stereogram having parallaxes only in the horizontal direction is produced. An HPO type holographic stereogram can be printed in a short time and recorded with high quality. There are many demands of recording natural spatial effects not only with horizontal parallaxes but with vertical parallaxes. Although embossed type holographic stereograms have been widely used for forgery prevention of credit cards, they have been easily forged. The embossed type holographic stereograms are being replaced with more advanced volume (Lipman) recording mediums. Since the volume recording mediums allow for recording of vertical parallaxes that are not theoretically represented by the embossed holographic stereograms, there were demands of a recording system that has further improving forgery prevention effects with the vertical parallaxes.

Full parallax (FP) holographic stereograms having parallaxes both in the horizontal and vertical directions have been proposed, for example, in Japanese Patent Application Laid-Open No. HEI 6-266274 and Japanese Patent Application Laid-Open (translation version of PCT international publication) No. 2002-530699.

SUMMARY OF THE INVENTION

FP holographic stereograms can be produced at low cost because an optical system can be composed of a combination of spherical lenses. In addition, since dot-shaped elemental holograms are recorded in the FP holographic stereograms, the exposure area of one elemental hologram can be decreased. As a result, the FP holographic stereograms can be produced advantageously at low shutter speeds with a low power laser. However, if the area of each elemental hologram is small, since the number of elemental holograms necessary for surface exposure increases, the exposure time becomes long. In addition, since boundaries of elemental holograms are visible, smooth images are not obtained.

In view of the foregoing, it would be desirable to provide an image recording method, an image recording apparatus, and an image record medium that provide vertical parallaxes along with high image quality and high speed of HPO holographic stereograms.

According to an embodiment of the present invention, there is provided an image recording method of recording a holographic stereogram. An optical deflecting device is disposed in proximity to a hologram record medium when it is exposed with a stripe-shaped elemental hologram.

Either object beam or reference beam is deflected in a long side direction thereof through the optical deflecting device to expose the hologram record medium. The hologram record medium is multiply exposed at least two times with different deflection angles of the optical deflecting device to cause the elemental hologram to have a plurality of parallaxes in a long side direction of the elemental hologram.

The optical deflecting device is preferably a prism sheet having a micro structure in a long side direction of the optical deflecting device. A multiple exposure is preferably performed at least two times with different deflection angles of the prism sheet to cause the elemental hologram to have a plurality of parallaxes in the long side direction of the elemental hologram.

The prism sheet is disposed on the object beam side or reference beam side.

An optical function device which spreads the object beam only in the long side direction by a predetermined angle is preferably disposed between the optical deflecting device and the hologram record medium.

According to an embodiment of the present invention, after a region of the hologram record medium is exposed with one elemental hologram transmitted by the optical deflecting device at a particular deflection angle is exposed, the optical deflecting device is disposed at a different deflection angle while the hologram record medium is not moved. After the same region is multiply exposed, the hologram record medium and an optical system are relatively moved until surface exposure is completed.

According to an embodiment of the present invention, while the optical deflecting device is disposed at a particular deflection angle, whenever the hologram record medium is exposed with each elemental hologram, the hologram record medium and the optical system are relatively moved until the surface exposure is completed and then the optical deflecting device is disposed at each deflection angle until the multiple exposure is completed.

According to an embodiment of the present invention, there is provided an image recording apparatus which records a holographic stereogram. The image recording apparatus includes an optical deflecting device and an exposure control section. The optical deflecting device includes a spatial light modulation device, an anamorphic optical system having different aspect ratios, and an optical deflecting element having a plurality of refraction angles at which beam is refracted in its long side direction and being movable in parallel with a record medium, the optical deflecting device being disposed in proximity to a hologram record medium when it is exposed with a stripe-shaped elemental hologram, the optical deflecting device deflecting either object beam or reference beam in a long side direction thereof to expose the hologram record medium. The exposure control section multiply exposes the hologram record medium at least two times with different deflection angles of the optical deflecting device to cause the elemental hologram to have a plurality of parallaxes in a long side direction of the elemental hologram.

According to an embodiment of the present invention, there is provided an image record medium on which a holographic stereogram is recorded. The holographic stereogram is produced by disposing an optical deflecting device in proximity to a hologram record medium when it is exposed with a stripe-shaped elemental hologram, deflecting either object beam or reference beam in a long side direction thereof through the optical deflecting device to expose the hologram record medium, and multiply exposing the hologram record medium at least two times with different deflection angles of the optical deflecting device to cause the elemental hologram to have a plurality of parallaxes in a long side direction of the elemental hologram.

As is clear from the foregoing description, according to an embodiment of the present invention, a full parallax type holographic stereogram having independent vertical parallaxes and horizontal parallaxes can be produced with high quality using an optical system, a mechanical section, and a control section that record elemental holograms having horizontal parallaxes. Thus, a holographic stereogram that has higher image quality, higher speed, and less remarkableness of boundaries of elemental holograms than those of a dot-shaped full-parallax type holographic stereogram can be produced.

According to an embodiment of the present invention, a holographic stereogram can be clearly seen because boundaries of elemental holograms are unremarkable. Since human eyes are arranged on the left and right sides of the face, they are more sensitive for horizontal parallaxes than for vertical parallaxes. Thus, vertical parallaxes can be set independent from horizontal parallaxes. In the case of a spherical-lens type full-parallax holographic stereogram of the related art, vertical parallaxes and horizontal parallaxes can be independently selected. As a result, according to this embodiment, holographic stereograms having different aspect ratios can be recorded.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a schematic diagram showing an exemplary structure of a holographic stereogram producing system according to an embodiment of the present invention;

FIG. 2 is a schematic diagram describing an example of an image process of producing a holographic stereogram;

DETAILED DESCRIPTION OF THE PREFERRED EMBODIMENTS

Figures 3A, 3B:
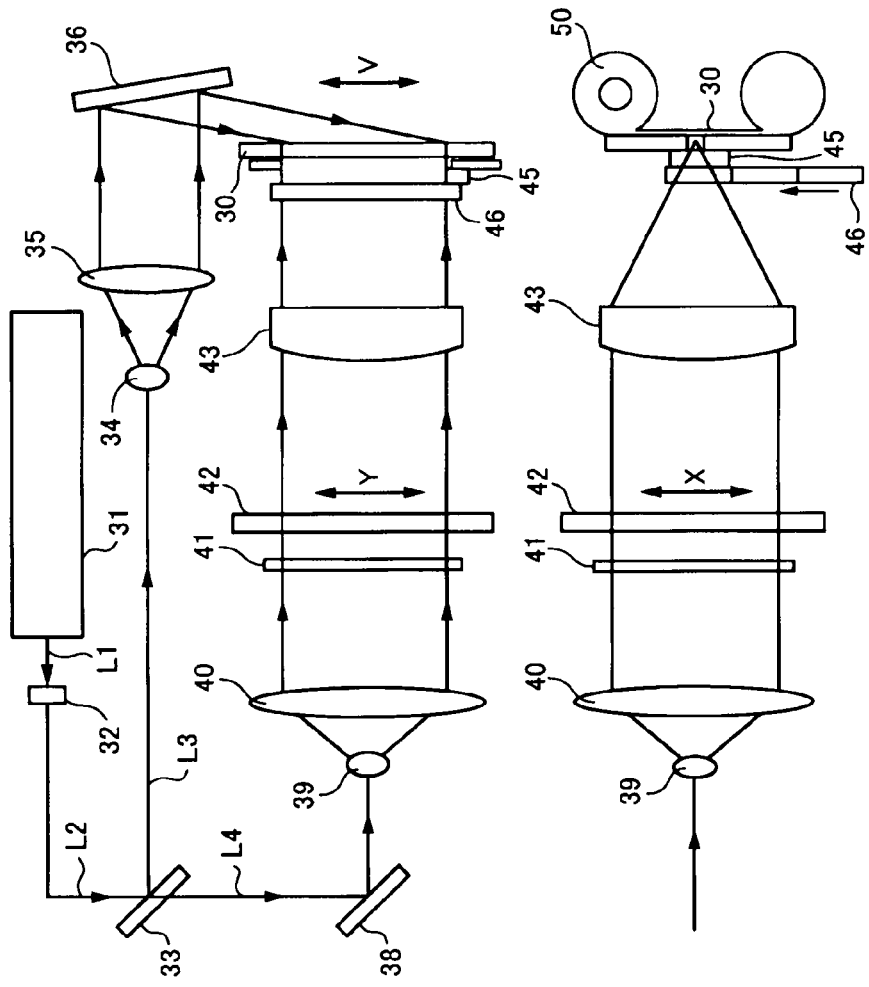
FIG. 3A and FIG. 3B are schematic diagrams showing an exemplary optical system of a holographic stereogram printer device.

Next, with reference to the accompanying drawings, several specific embodiments of the present invention will be described in detail. It should be noted that the present invention is not limited to the following examples and that they may be modified without departing from the scope and spirit of the present invention.

The relationship between the elements of the Claims and the elements of the embodiments is as follows.

In a holographic stereogram, stripe-shaped elemental holograms are recorded on a hologram record medium 30. A prism sheet 46 is used as an optical deflecting device. One of object beam L4 and reference beam L3 is deflected in the long side direction through the prism sheet 46 such that a hologram record medium 30 is exposed with the object beam L4 and the reference beam L3. By multiply exposing the hologram record medium at least two times with the object beam L4 and the reference beam L3 at different deflection angles (refraction angles of the prism sheet 46) of the optical deflecting device, a plurality of parallaxes occur in the long side direction of the elemental hologram. An optical function plate 45, which is an optical functional device that spreads beam only in the long side direction by a predetermined angle, is disposed between the prism sheet 46 and the hologram record medium 30. According to an embodiment of the present invention, as shown in a flow chart of FIG. 13, after the hologram record medium 30 is exposed with an elemental hologram transmitted by an optical deflecting device having a predetermined deflection angle, the optical deflecting device having a different deflection angle is disposed without moving the hologram record medium and the same region is multiply exposed. Thereafter, the hologram record medium and the optical system are relatively moved until the surface exposure is completed. Instead, as shown in a flow chart of FIG. 12, while an optical deflecting device having a particular deflection angle is disposed, whenever the hologram record medium is exposed with each elemental hologram, the hologram record medium and the optical system are relatively moved until the surface exposure is completed. Thereafter, an optical deflecting device having a different deflection angle is disposed for the surface exposure. In such a manner, multiple exposure is completed for each refraction angle.

First, an exemplary structure of a holographic stereogram producing system that produces a holographic stereogram will be described. First, as a base optical system, an apparatus that records stripe-shaped elemental holograms on one record medium and thereby produces a holographic stereogram having horizontal parallax information will be described.

The holographic stereogram producing system is a system that produces a so-called one-step holographic stereogram that is a hologram record medium on which interference fringes of object beam and reference beam have been recorded. As shown in FIG. 1, the holographic stereogram producing system includes a data processing section 1 that performs a process for image data to be recorded, a control computer 2 that controls the entire system, and a holographic stereogram printer device 3 that has an optical system that produces a holographic stereogram.

The data processing section 1 produces a parallax image sequence D3 based on image data D1 that are composed of a plurality of images, that contain parallax information, and that are supplied from a parallax image sequence photographing device 13 having a multi-eye camera, a moving camera, or the like and image data D2 that are composed of a plurality of images, that contain parallax information, and that are generated by an image data generating computer 14.

The image data D1, composed of a plurality of images, containing parallax information, and supplied from the parallax image sequence photographing device 13 are image data composed of a plurality of images of an object, for example, simultaneously taken by a multi-eye camera or successively taken by a moving camera from a plurality of horizontally different points.

On the other hand, the image data D2, composed of a plurality of images, containing parallax information, and generated by the image data generating computer 14, are image data composed of a plurality, for example, of computer aided design (CAD) images or computer graphics (CG) images having horizontally sequential parallaxes.

The data processing section 1 causes an image processing computer 11 to perform a predetermined image process for a holographic stereogram based on the parallax image sequence D3. The image data D4 for which the predetermined image process has been performed are recorded to a storage device 12 such as a memory or a hard disk.

When the data processing section 1 records images to the hologram record medium, the data processing section 1 reads data for each image from the image data D4 recorded in the storage device 12 and sends the data for each image as image data D5 to the control computer 2.

On the other hand, the control computer 2 drives the holographic stereogram printer device 3 to successively record images based on the image data D5 supplied from the data processing section 1 as stripe-shaped elemental holograms to the hologram record medium 30 set in the holographic stereogram printer device 3.

At this point, the control computer 2 controls a shutter 32, a display device 41, a record medium feeding mechanism, and so forth disposed in the holographic stereogram printer device 3 as will be described later. In other words, the control computer 2 sends a control signal S1 to the shutter 32 to control opening/closing of the shutter 32. The control computer 2 sends the image data D5 to the display device 41 to display images based on the image data D5. The control computer 2 sends a control signal S2 to the record medium feeding mechanism to control the feeding operation of the hologram record medium 30.

As shown in FIG. 2, in the image process, a plurality of images of the image data D1 containing parallax information are divided in the parallax direction, namely, horizontal (wide) direction and then divided slices are collected as the image data D5. The image data D5 are displayed on the display device 41.

Next, with reference to FIG. 3A and FIG. 3B, an optical system of the holographic stereogram printer device 3 will be described in detail. FIG. 3A is a top view showing the entire optical system of the holographic stereogram printer device 3. FIG. 3B is a side view showing the overall optical system of the holographic stereogram printer device 3.

As shown in FIG. 3A and FIG. 3B, the holographic stereogram printer device 3 includes a laser beam source 31 that emits laser beam having a predetermined wavelength, a shutter 32 disposed on the optical axis of laser beam L1 emitted from the laser beam source 31, a mirror 38, and a half mirror 33. In this example, it is assumed that the laser beam source 31 emits laser beam having a wavelength of around 532 nm.

Instead, the laser beam source 31 may be an argon laser having a wavelength of 514.5 nm and an output of 200 mW.

The shutter 32 is controlled by the control computer 2. The shutter 32 is closed when the hologram record medium 30 is not exposed. The shutter 32 is opened when the hologram record medium 30 is exposed. The half mirror 33 separates laser beam L2 transmitted by the shutter 32 into reference beam and object beam. Beam L3 reflected by the half mirror 33 becomes reference beam and beam L4 transmitted by the half mirror 33 becomes object beam.

In the optical system, the optical path length of the reference beam that is reflected by the half mirror 33 and that enters the hologram record medium 30 is nearly the same as that of the object beam transmitted by the half mirror 33 and that enters the hologram record medium 30. Thus, since the coherency of the reference beam and the object beam increases, a holographic stereogram of a more clear image can be produced.

Disposed successively on the optical axis of the beam L3 reflected by the half mirror 33 are as a reference beam optical system, a cylindrical lens 34, a collimator lens 35 that collimates the reference beam, and a total reflection mirror 36 that reflects the collimated beam emitted from the collimator lens 35.

Beam reflected by the half mirror 33 is diverged by the cylindrical lens 34 and then collimated by the collimator lens 35. Thereafter, the collimated beam is reflected by the total reflection mirror 36 and enters the rear surface of the hologram record medium 30.

Disposed successively on the optical axis of the beam L4 transmitted by the half mirror 33 are as an object beam optical system a total reflection mirror 38, a spatial filter 39, a collimator lens 40, a display device 41, a one-dimensional spreading plate 42, a cylindrical lens 43, a prism sheet 46, and an optical function plate 45. The total reflection mirror 38 reflects beam transmitted by the half mirror 33. The spatial filter 39 is composed of an convex lens and a pin hole. The collimator lens 40 collimates the object beam. The display device 41 displays an image to be recorded. The one-dimensional spreading plate 42 spreads beam transmitted by the display device 41 in the wide direction of an elemental hologram. The cylindrical lens 43 focuses the object beam transmitted by the one-dimensional spreading plate 42 onto the hologram record medium 30. The prism sheet 46 has an optical deflecting device, for example, a micro structure in the long side direction. The optical function plate 45 has a one-dimensional spreading function.

The cylindrical lens 43 focuses the object beam in the first parallax direction (short side direction of elemental holograms or horizontal observation direction). The prism sheet 46 deflects the object beam in the second parallax direction (long side direction of elemental holograms or vertical observation direction). As will be described later, the prism sheet 46 has a structure of which prism sheets having different refraction angles are connected in the vertical direction. In FIG. 3B, the prism sheet 46 is composed of three prism sheets that are connected.

When one elemental hologram is recorded to the hologram record medium 30 through the prism sheet 46, the hologram record medium 30 is multiply exposed with it three times. As a result, an image can be recorded such that it has a plurality of parallaxes not only in the short side direction of the elemental hologram, but in the long side direction thereof. To multiply expose the hologram record medium 30 with the elemental hologram such that it has parallaxes in the long side direction, the prism sheet 46 and the hologram record medium 30 are relatively moved in the long side direction. In this embodiment, the hologram record medium 30 is fixed, whereas the prism sheet 46 is moved in the long side direction. The prism sheet 46 may be disposed on the reference beam side instead of the object beam side.

The optical function plate 45 one-directionally spreads the focused object beam in the long side direction of the stripe-shaped elemental holograms as the view point is moved in the long side direction. The optical function plate 45 has a finer structure than the micro structure of the prism sheet 46. A lenticular lens having fine pitches may be used for the optical function plate 45. Such an optical function plate 45 may be disposed on the front surface of the prism sheet 46 instead of the rear surface thereof. By moving an image displayed on a liquid crystal display as a spatial modulating device, an error of a projected image due to differences of distances between the refraction surfaces of the prism sheet 46 and the principal surface of the hologram record medium 30 may be corrected.

The beam L4 transmitted by the half mirror 33 is reflected by the total reflection mirror 38 and then diverged by the spatial filter 39 as if the diverged beam is emitted from a point beam source. Thereafter, the diverged beam is collimated by the collimator lens 40. Thereafter, the collimated beam enters the display device 41. In this embodiment, the spatial filter 39 is composed of a 20× objective lens and a 20 μm-diameter pin hole. The focal distance of the collimator lens 40 is 100 mm.

The display device 41 is a projection type image display device composed, for example, of a liquid crystal display. The display device 41 is controlled by the control computer 2. The display device 41 displays images based on the image data D5 sent from the control computer 2. In this example, the display device 41 is a monochrome display device 41 having 480× 1068 pixels and a dimension of 16.8 mm×29.9 mm.

Beam transmitted by the display device 41 is modulated by an image displayed thereon and then spread by the one-dimensional spreading plate 42. The one-dimensional spreading plate 42 is disposed in proximity to the display device 41, for example, immediately followed by the display device 41 or immediately preceded thereby. In this example, the one-dimensional spreading plate 42 is immediately preceded by the display device 41.

The one-dimensional spreading plate 42 slightly spreads beam transmitted by the display device 41 in the wide direction of an elemental hologram to disperse the beam in the elemental holograms. As a result, the image quality of the produced holographic stereogram is improved.

At this point, the one-dimensional spreading plate 42 is provided with a spreading plate moving section (not shown). Whenever each elemental hologram is formed, the primary spreading plate 42 is randomly moved. The position of the primary spreading plate 42 is changed for each elemental hologram. Thus, upon observation, infinitely distant noise of the hologram can be reduced.

As the spreading plate moving section that moves the one-dimensional spreading plate 42, a moving mechanism such as a stepping motor that moves the one-dimensional spreading plate 42 for a constant amount can be used. The moving direction of the one-dimensional spreading plate 42 may be the wide direction of the elemental hologram (arrow X in FIG. 3B) or a direction perpendicular thereto (arrow Y in FIG. 3A). Instead, the moving direction of one-dimensional spreading plate 42 may be a combination of these directions or may be at random, or reciprocal.

Thus, with the one-dimensional spreading plate 42 disposed in such a manner, since the hologram record medium 30 is equally exposed with the elemental hologram in the wide direction, the image quality of the produced hologram is improved. However, if the hologram record medium 30 is equally exposed with the elemental hologram in the wide direction, it is necessary to cause the one-dimensional spreading plate 42 to strongly spread beam to some extent. However, the object beam spread by the one-dimensional spreading plate 42 spreads on the hologram record medium 30. As a result, the hologram record medium 30 is exposed in a wider range than the width of the original elemental hologram.

Figures 4A, 4B:
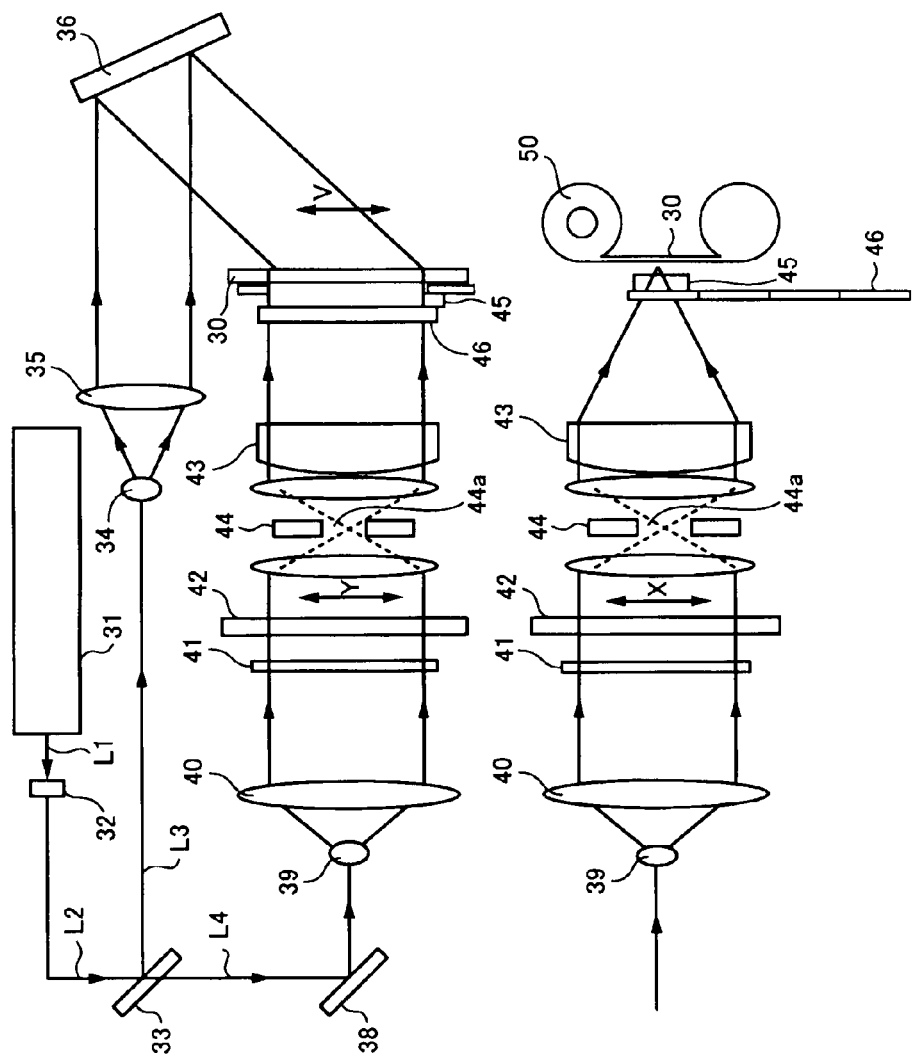
FIG. 4A and FIG. 4B are schematic diagrams showing another exemplary optical system of the holographic stereogram printer device.

Thus, as shown in FIG. 4A and FIG. 4B, a mask 44 is disposed in the optical path and an image of the mask is projected on the record material such that the hologram record medium 30 is exposed with each elemental hologram having an appropriate width. In other words, beam is spread by the one-dimensional spreading plate 42 and unnecessary beam is shielded by the mask 44 such that the hologram record medium 30 is uniformly exposed with each elemental hologram having an appropriate exposure width. As shown in FIG. 4A and FIG. 4B, the mask 44 may be disposed between the one-dimensional spreading plate 42 and the cylindrical lens 43 or in proximity to the hologram record medium 30.

In other words, beam transmitted by the display device 41 is transmitted by the one-dimensional spreading plate 42 and then spread in the wide direction of the elemental hologram. Thereafter, the spread beam is focused on the hologram record medium 30 by the cylindrical lens 43. At this point, the object beam does not focus on one point, but spreads in a particular range due to influence of the one-dimensional spreading plate 42.

As shown in FIG. 4A and FIG. 4B, only a predetermined range of a center portion of the spread focused beam is transmitted by an opening portion 44a of the mask 44 and enters as object beam the hologram record medium 30. The object beam is stripe-shaped.

As described above, the optical function plate 45 is disposed as a second spreading plate. The object beam one-directionally spreads in the long side direction of the stripe-shaped elemental hologram. The hologram record medium 30 is irradiated with the object beam. Thus, the vertical view angle of the reflection type hologram can be increased.

In regular holographic stereograms having horizontal parallaxes, the optical function plate 45 has the nearly same optical function angle as that of the vertical view angle of the final holographic stereogram. However, in this embodiment of the present invention, the primary spread angle is narrowed and the optical function plate 45 is disposed in proximity to the one-dimensional spreading plate.

The holographic stereogram printer device 3 has a record medium feeding mechanism 50 that intermittently feeds the hologram record medium 30 for one elemental hologram under the control of the control computer 2. As will be described later, the record medium feeding mechanism 50 intermittently feeds a film-shaped hologram record medium based on a control signal supplied from the control computer 2. When a holographic stereogram is produced by the holographic stereogram printer device 3, the hologram record medium 30 is set to the record medium feeding mechanism 50 in a predetermined state. Images based on image data of a parallax image sequence are successively recorded as stripe-shaped elemental holograms to the hologram record medium 30.

Figure 5:
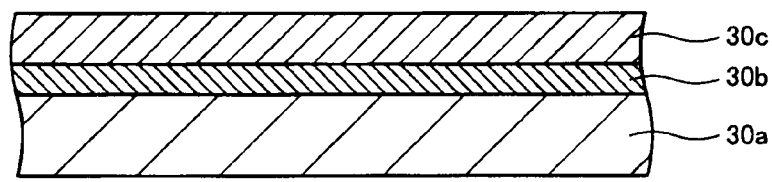
FIG. 5 is a sectional view showing an example of a hologram record medium.

Next, the hologram record medium 30 used in the foregoing holographic stereogram producing system will be described in detail. As shown in FIG. 5, the hologram record medium 30 is a so-called film-coated record medium made by forming a photopolymer layer 30b composed of a photo-polymerized photopolymer layer on a tape-shaped film base material 30a and coating a cover sheet 30c on the photopolymer layer 30b.

Figure 6A:
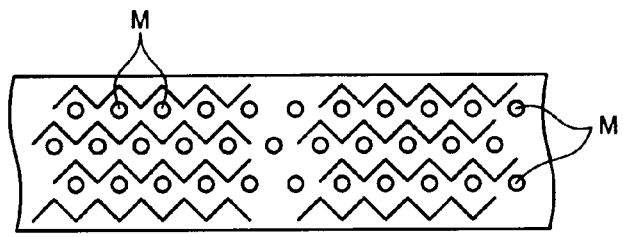
FIG. 6A, FIG. 6B, and FIG. 6C are schematic diagrams showing a photosensitive process of a photo-polymerized photopolymer.
Figure 6B:
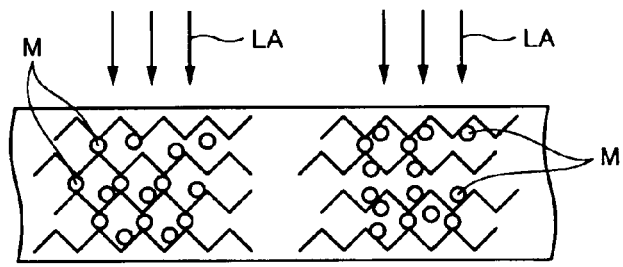
Figure 6C:
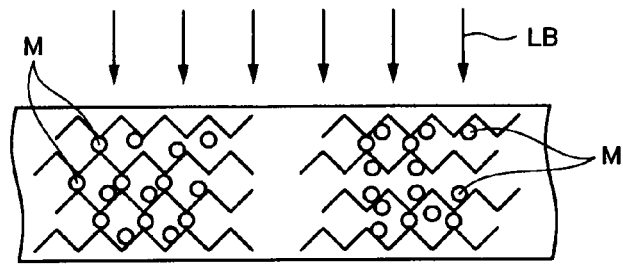

As shown in FIG. 6A, initially in a photo-polymerized photopolymer, monomer molecules M are equally dispersed in matrix polymer molecules. On the other hand, as shown in FIG. 6B, when the photo-polymerized photopolymer is irradiated with beam LA having a power of around 10 to 400 mJ/cm$^2$, the monomer molecules M are polymerized at the exposure site. As the monomer molecules M are polymerized, they move and the concentrations of the monomer molecules M change position by position. As a result, refractive index modulation occurs. Thereafter, as shown in FIG. 6, when the full surface of the photopolymer is irradiated with ultraviolet light or visible light LB having a power of 1000 mJ/cm$^2$, the monomer molecules M are polymerized. Thus, since the refractive indexes of photo-polymerized photopolymer change depending on incident beam, interference fringes due to interference of the reference beam and object beam can be recorded as changes of refractive indexes.

In the hologram record medium 30 composed of such photo-polymerized photopolymer, it is not necessary to perform a particular developing treatment for the photo-polymerized photopolymer after it has been exposed. Thus, since the holographic stereogram printer device 3 according to this embodiment of the present invention uses the hologram record medium 30 having a photosensitive portion made of photo-polymerized photopolymer, the holographic stereogram printer device 3 can be simply structured.

Figure 7:
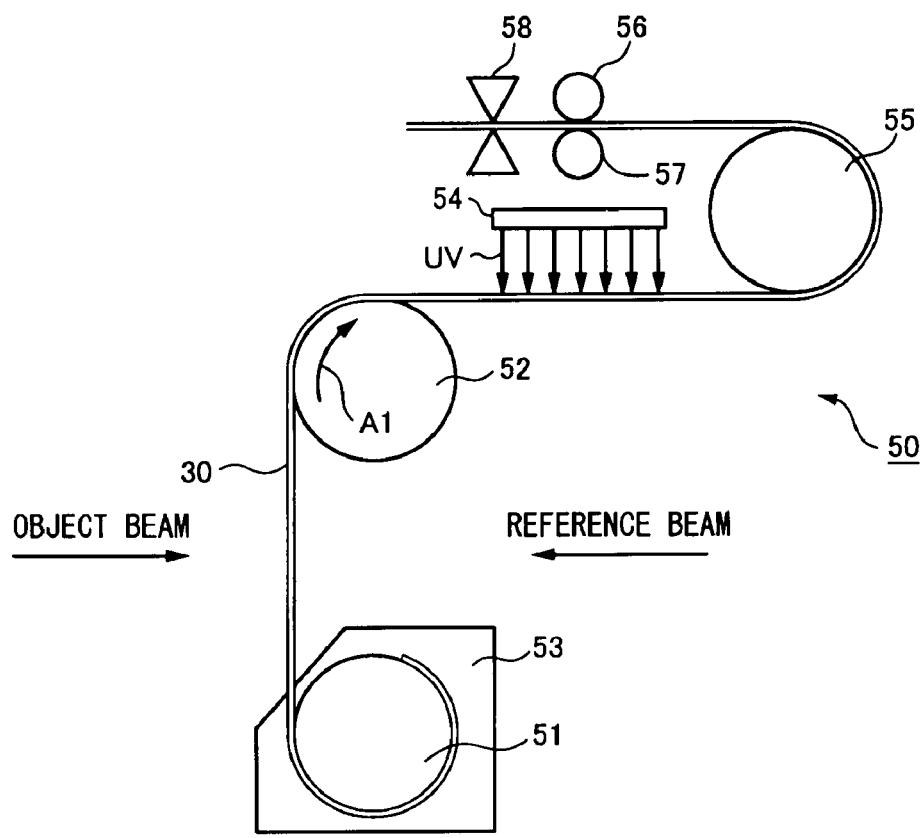
FIG. 7 is a schematic diagram showing an exemplary structure of a record medium feeding mechanism.

Next, the record medium feeding mechanism 50 will be described in detail. FIG. 7 is an enlarged view of the record medium feeding mechanism 50 of the holographic stereogram printer device 3.

As shown in FIG. 7, the record medium feeding mechanism 50 has a roller 51 and an intermittently feeding roller 52. The hologram record medium 30 is wound on the roller 51 and housed in a film cartridge 53. The record medium feeding mechanism 50 rotatably holds the roller 51 housed in the film cartridge 53 with a predetermined torque. In addition, the record medium feeding mechanism 50 holds the hologram record medium 30 pulled out from the film cartridge 53 both with the roller 51 and the intermittently feeding roller 52. At this point, the record medium feeding mechanism 50 holds the hologram record medium 30 such that a principal surface of the hologram record medium 30 becomes nearly perpendicular to the object beam between the roller 51 and the intermittently feeding roller 52. In addition, the roller 51 and the intermittently feeding roller 52 are tensioned by a torsion coil spring such that the roller 51 and the intermittently feeding roller 52 are apart therefrom each other. Thus, the hologram record medium 30 loaded between the roller 51 and the intermittently feeding roller 52 are tensioned by a predetermined amount of force.

The intermittently feeding roller 52 of the record medium feeding mechanism 50 is connected to a stepping motor (not shown) such that the intermittently feeding roller 52 is freely rotatable with the rotating force of the stepping motor in the direction designated by arrow A1 of the drawing. The stepping motor successively rotates the intermittently feeding roller 52 by a predetermined angle corresponding to one elemental hologram whenever the hologram record medium is exposed with one image based on the control signal S2 supplied from the control computer 2. Thus, the hologram record medium 30 is fed for one elemental hologram whenever the hologram record medium is exposed with one image.

Disposed downstream of the intermittently feeding roller 52 in the path of the hologram record medium 30 is an ultraviolet lamp 54. The ultraviolet lamp 54 completes polymerization of monomer molecules M of the hologram record medium 30 that have been exposed. In other words, the ultraviolet lamp 54 irradiates the hologram record medium 30 fed by the intermittently feeding roller 52 with ultraviolet light UV having a predetermined power.

Disposed downstream of the ultraviolet lamp 54 in the path of the hologram record medium 30 are a heat roller 55 that is rotatably pivoted, a pair of unloading rollers 56 and 57, and a cutter 58.

The unloading rollers 56 and 57 feed the hologram record medium 30 such that the cover sheet 30c of the hologram record medium 30 is tightly wound on the outer circumference surface of the heat roller 55 for nearly a half turn. The unloading rollers 56 and 57 are connected to a stepping motor (not shown) and rotated by rotation force thereof. The stepping motor successively rotates the unloading rollers 56 and 57 for a predetermined angle corresponding to one elemental hologram whenever the hologram record medium is exposed with one image based on the control signal S2 supplied from the control computer 2 in synchronization with the rotation of the intermittently feeding roller 52. Thus, the hologram record medium 30 is fed between the hologram record medium 30 and the unloading rollers 56 and 57 in the state that it is tightly wound on the circumference of the heat roller 55.

The heat roller 55 has an internal heat generating section such as a heater. The heating section keeps the temperature of the circumference surface of the heat roller 55 at around 120° C. The heat roller 55 heats the photopolymer layer 30b of the hologram record medium 30 through the cover sheet 30c to increase the refractive index modulation rate of the photopolymer layer 30b and fix record images on the hologram record medium 30. Thus, the outer diameter of the heat roller 55 is selected such that record images are fixed on the hologram record medium 30 after it begins to be in contact with the circumference surface of the heat roller 55 until the hologram record medium 30 is apart therefrom.

The cutter 58 also has a cutter driving mechanism (not shown). By driving the cutter driving mechanism, it cuts the hologram record medium 30 that has been fed. The cutter driving mechanism drives the cutter 58 based on the control signal S2 supplied from the control computer 2 after images based on image data of the parallax image sequence have been recorded on the hologram record medium 30 and the recorded portion of the hologram record medium 30 has exited from the cutter 58. Thus, the recorded portion of the hologram record medium 30 is cut out as one holographic stereogram from the rest of the hologram record medium 30 and ejected to the outside.

Figure 8:
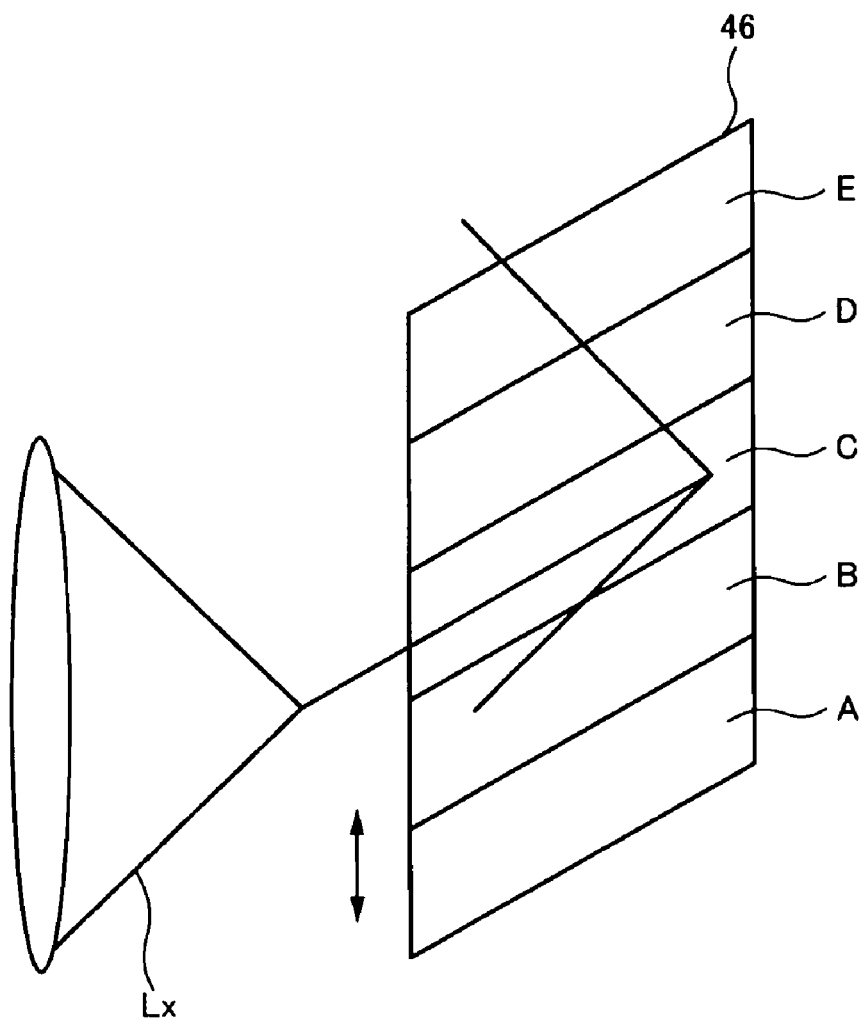
FIG. 8 is a schematic diagram describing a prism sheet.

As shown in FIG. 8, the prism sheet 46 has five elemental prisms A, B, C, D, and E in the upper and lower directions of the printer, namely the horizontal directions (short side direction of elemental holograms) in which the user feels continuous parallaxes upon observation. The prism sheet 46 has a micro structure of which the elemental prisms have different refraction angles. The object beam spreads in the direction depending on the position (elemental prism) at which the object beam enters the prism sheet 46. For example, the refraction angle of the elemental prism C is 0°. The refraction angle of the elemental prism B is +15°. The refraction angle of the elemental prism D is −15°. The refraction angle of the elemental prism A is +30°. The refraction angle of the elemental prism E is −30°. Object beam Lx converged by the cylindrical lens 43 is projected on the hologram record medium 30 through one of the elemental prisms A to E. In the example shown in FIG. 8, the object beam is projected on the hologram record medium 30 through the elemental prism C. The prism sheet 46 is slidable in the upper and lower directions of the printer by a driving mechanism (not shown) so as to set an elemental prism (refraction angle) to be used.

Figure 9A:
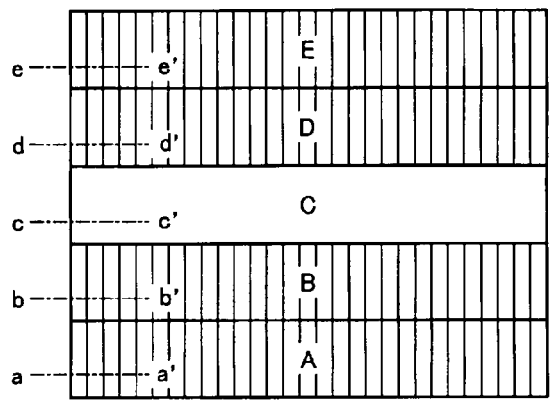
FIG. 9A and FIG. 9B are schematic diagrams describing the prism sheet.
Figure 9B:
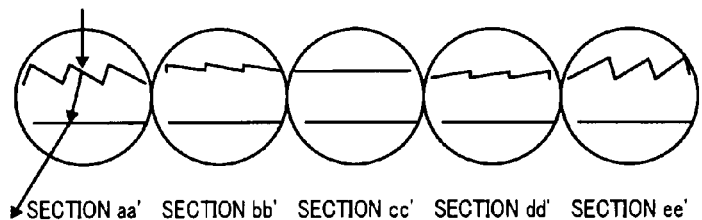
Figure 10:
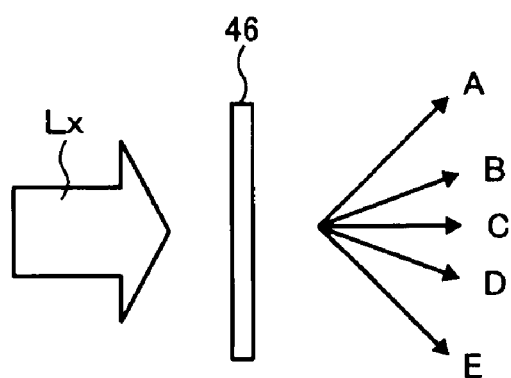
FIG. 10 is a schematic diagram describing the prism sheet.

FIG. 9A and FIG. 9B show the prism sheet 46 in detail. As shown in FIG. 9A, the elemental prisms A, B, C, D, and E have a micro structure in the long side direction. As shown in FIG. 9B, the incident surfaces of the micro structures of the elemental prisms A to E are, for example, inclined surfaces. As shown in FIG. 10, upon observation, elemental prisms reflect incident beam at a desired angle in the upper and lower directions and then exit them. Although the pitches of the real micro structures are finer than those shown in FIG. 9A, for simplicity, macrostructures having relatively large pitches are shown. In this embodiment, the hologram record medium 30 is multiply exposed at least two times through elemental prisms having different refraction angles. As a result, a plurality of parallaxes can be provided in the long side direction of the elemental hologram. The prism sheet 46 shown in FIG. 9A and FIG. 9B can provide five parallaxes in the upper and lower directions when observation. Instead, the number of parallaxes that the prism sheet 46 provides may be smaller than five. Instead, the number of parallaxes that the prism sheet 46 provides may be larger than five. Theoretically, the prism sheet 46 can provide 100 or more parallaxes. If the prism sheet provides many parallaxes, the one-dimensional spreading plate that secures vertical view angles upon observation is omitted.

Figure 11A:
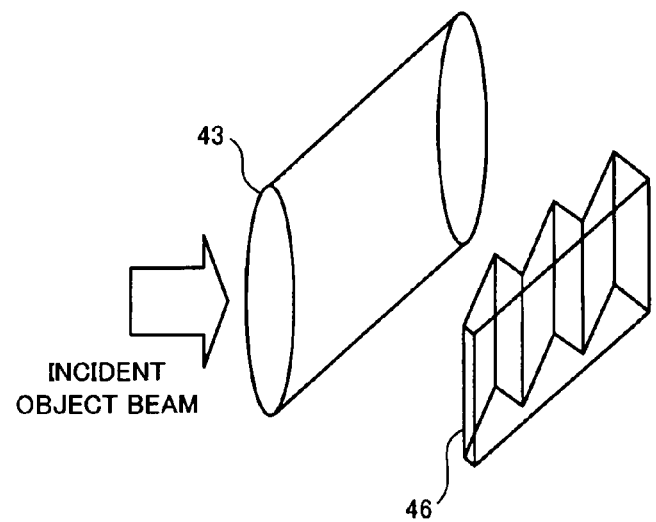
FIG. 11A and FIG. 11B are schematic diagrams describing the prism sheet.
Figure 11B:
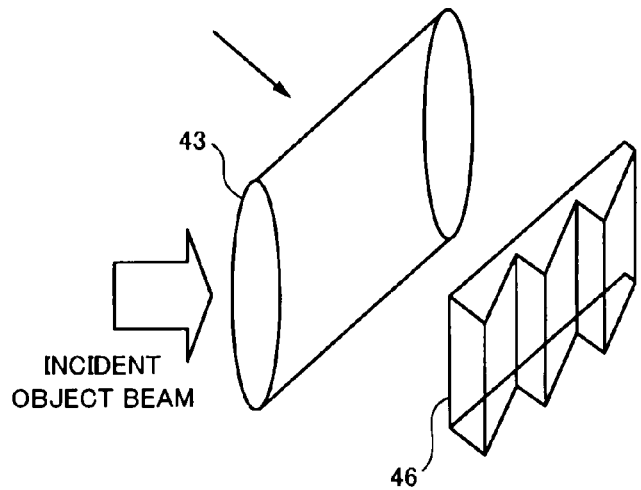

In the example of the prism sheet 46 shown in FIG. 9A and FIG. 9B, the incidence surfaces are inclined surfaces as shown in FIG. 11A. Instead, a prism sheet having inclined exit surfaces may be used as shown in FIG. 11B. Since the aberration of the prism sheet 46 (FIG. 11A) having inclined incident surfaces is small and total reflection hardly occurs thereon, the prism sheet 46 is advantageous in aberration and deflecting error in comparison with the prism sheet having inclined exit surfaces (FIG. 11B). In contrast, the prism sheet having inclined exit surfaces is advantageous in error of vertical recording position upon observation because the inclined surfaces can be placed in proximity to the principle surface of the hologram record medium 30.

It is clear that the prism sheet is preferably as thin as possible from a view point of small aberration.

If the number of upper and lower parallaxes upon observation is odd, the center elemental prism C can have no refraction angle. Functionally, the center elemental prism can be omitted. However, to match the optical path lengths of elemental prisms, a flat plate that is made of the same material and that has the same refractive index and nearly same thickness as those of the other elemental prisms is disposed like a portion C shown in FIG. 8.

Next, with reference to a flow chart shown in FIG. 12, a process of producing a holographic stereogram under the control of the control computer 2 of the holographic stereogram producing system will be described.

Figure 12:
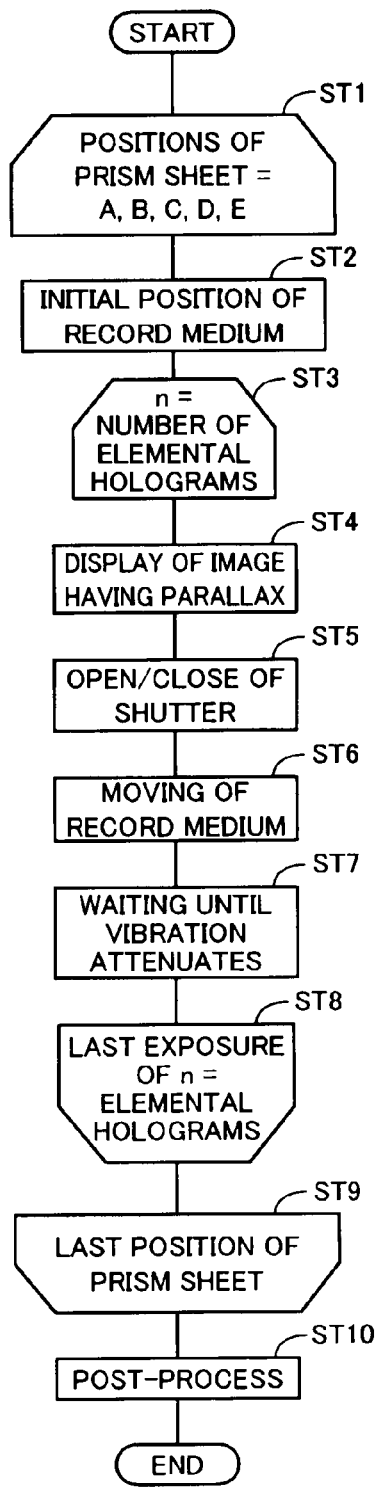
FIG. 12 is a flow chart showing an exemplary exposure process.

At step ST1 shown in FIG. 12, the positions of the prism sheet 46 are set, for example, such that the object beam passes through the elemental prism C. At step ST1, one loop of the process starts. At step ST9, this loop of the process ends. Whenever the process is executed from step ST2 to step ST8, the positions of the prism sheet 46 are changed such that the elemental prisms are changed in the order of C→B→D→A→E. Instead, the elemental prisms may be changed in the upward or downward direction of the printer from one end to the other end (positions of different refraction angles).

At step ST2, the hologram record medium 30 is placed at the initial position. At step ST3, anther loop starts. At step ST8, this loop ends. Whenever the process is executed from step ST4 to step ST7, one elemental hologram is processed. The process is repeated from step ST4 to step ST7 until all elemental holograms (n) are processed.

At step ST4, the control computer 2 drives the display device 41 based on the image data D5 supplied from the data processing section 1 to display the image data D5. At step ST5, the control computer 2 sends the control signal S1 to the shutter 32 to open it for a predetermined time such that the hologram record medium 30 is exposed. At this point, the beam L3 reflected by the half mirror 33 of the laser beam L2 emitted from the laser beam source 31 and transmitted by the shutter 32 enters as reference beam the hologram record medium 30. In addition, the beam L4 transmitted by the half mirror 33 becomes projected beam of an image displayed on the display device 41. The projected beam enters as object beam the hologram record medium 30. Thus, one image displayed on the display device 41 is recorded as a stripe-shaped elemental hologram to the hologram record medium 30.

After one image has been recorded to the hologram record medium 30, the flow advances to step ST6. At step ST6, the control computer 2 sends the control signal S2 to the stepping motor connected to the intermittently feeding roller 52 and the stepping motor connected to the unloading rollers 56 and 57 to drive them such that the hologram record medium 30 is fed for one elemental hologram. After the hologram record medium 30 has been fed, it is takes a time until the vibration attenuates (at step ST7).

Thereafter, the flow returns to step ST4. At step ST4, the control computer 2 drives the display device 41 based on the next image data D5 supplied from the data processing section 1 to display the next image. Thereafter, the foregoing process (ST5, ST6, and ST7) is successively repeated. As a result, each image of the image data D5 supplied from the data processing section 1 is successively recorded as a stripe-shaped elemental hologram to the hologram record medium 30.

In other words, in the holographic stereogram producing system, the positions of the prism sheet are set such that object beam passes through, for example, the elemental prism C. Images based on image data recorded on the storage device 12 are successively displayed on the display device 41. The shutter is opened for each image. Each image is successively recorded as a stripe-shaped elemental hologram to the hologram record medium 30. At this point, the hologram record medium 30 is fed for one elemental hologram corresponding to one image. Thus, each elemental hologram is successively arranged in the horizontal directions upon observation. As a result, a plurality of images containing horizontal parallax information and vertical parallax corresponding to the elemental prism C are recorded as a plurality of elemental holograms that are horizontally successive to the hologram record medium 30. Thus, a holographic stereogram having horizontal parallaxes and one vertical parallax can be obtained.

After a holographic stereogram having horizontal parallaxes is recorded, the hologram record medium 30 is returned to the initial position, the prism sheet 46 is moved by the stepping motor (not shown) and stopped at the position of, for example, the elemental prism B having a refractive index different from that of the elemental prism C. Thereafter, the process of recording a holographic stereogram having a horizontal parallax is executed (from step ST4 to step ST7 surrounded by steps ST3 and ST8). At this point, when a different image is recorded, a hologram observed as a vertical parallax of the first exposed image can be exposed.

The hologram record medium 30 is returned to the initial position by reversely rotating, for example, the stepping motor for a known drive distance or reading marking by a sensor and aligning the initial position. The marking may have been printed on the record medium. Instead, a marking image may be exposed by an elemental hologram exposure optical system and the reproduced image may be read.

As described above, after the hologram record medium 30 has been multiply exposed with the first and second images, the hologram record medium 30 is returned to the initial position, the hologram record medium 30 is exposed with a third image through the elemental prism D having the third refraction angle of the prism sheet. Thereafter, the hologram record medium 30 is exposed with images through the elemental prisms A and E. By repeatedly exposing the hologram record medium 30 with images, a hologram having, for example, five vertical parallaxes can be recorded.

In the foregoing example, the prism sheet 46 is disposed on the object beam side. Instead, the prism sheet 46 may be disposed on the reference beam side.

When a hologram record medium is multiply exposed with images, it is not necessary to record them in the same exposure condition and with the same exposure time. Experimental results show that a hologram record medium can be dually exposed with images using a photosensitive material made of cation type photo-polymerized photopolymer with high balance when the ratio of first and second exposure times is 1:4 although depending on exposure order and characteristics of photosensitive material. Likewise, experimental results show that hologram record medium can be triply exposed with images with high balance when the ratio of first, second, and third exposure times is 1:4:12.

The prism sheet was disposed on the object beam side. In this case, the one-dimensional spreading plate and the prism sheet were successively disposed in proximity to the hologram record medium. Theoretically, they may be reversely disposed. Instead, the one-dimensional spreading plate and the prism sheet may be integrated with optical adhesive agent or optical double-sided adhesive tape such that they are free of air. As a result, excessive scattering surfaces can be reduced.

A one-dimensional spreading function having a finer structure than a refracting micro structure may be disposed in parallel therewith on the front side or rear side of the prism sheet.

If the refracting surfaces of the prism sheet are apart from the principal surface of the hologram record medium, an image displayed on a spatial light modulator (SLM) using a liquid crystal deviates for the distance. As a result, images of upper and lower parallaxes can be prevented from deviating upon observation.

The prism sheet may be disposed on the reference beam side instead of the object beam side. In other words, the prism sheet is placed in contact with the hologram record medium 30 and reference beam enters diagonally from the opposite side of the prism sheet. Instead, the prism surfaces may be disposed on the hologram record medium side. Instead, the prism surfaces may be disposed on the reverse side. If the prism surfaces are disposed on the reverse side, since the principal surface of the hologram record medium and the surfaces of the prism sheet are in proximity to each other, extra interference fringes may occur. In this case, if a material having the same refractive index as that of the prism sheet is disposed in contact therewith, since the area of the surface that interfaces with air is reduced, extra interference fringes can be reduced.

Although the exposure process has been described, if necessary, a post-process is performed (at step ST10) and then the print process is completed. If it is necessary to perform ultraviolet irradiation and heating processes for photopolymer, the structure shown in FIG. 7 can be used. In other words, the ultraviolet lamp 54 irradiates ultraviolet light UV. As a result, monomer molecules M are polymerized. Thereafter, the hologram record medium 30 is heated by the heat roller 55 such that recorded images are fixed.

After an image recorded portion of the hologram record medium 30 has exited from the cutter, the control computer 2 sends the control signal S2 to the cutter driving mechanism to drive it. Thus, the image recorded portion is cut from the rest of the hologram record medium 30 by the cutter 58 and the image recorded portion is ejected as a holographic stereogram.

As a result, a holographic stereogram having horizontal parallaxes is completed.

In the foregoing example, after segment prisms of the prism sheet are changed and the hologram record medium is moved such that after the surface exposure is performed with one refraction angle, the surface exposure is performed with a different refraction angle. However, as shown in a flow chart of FIG. 13, multiple exposure may be performed for each elemental hologram.

Figure 13:
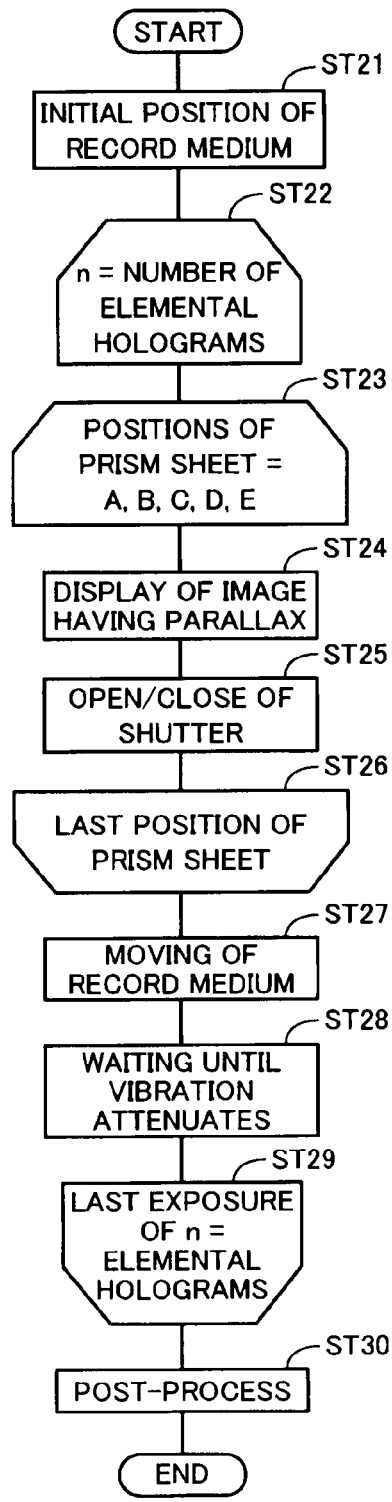
FIG. 13 is a flow chart showing another exemplary exposure process.
Figure 14:
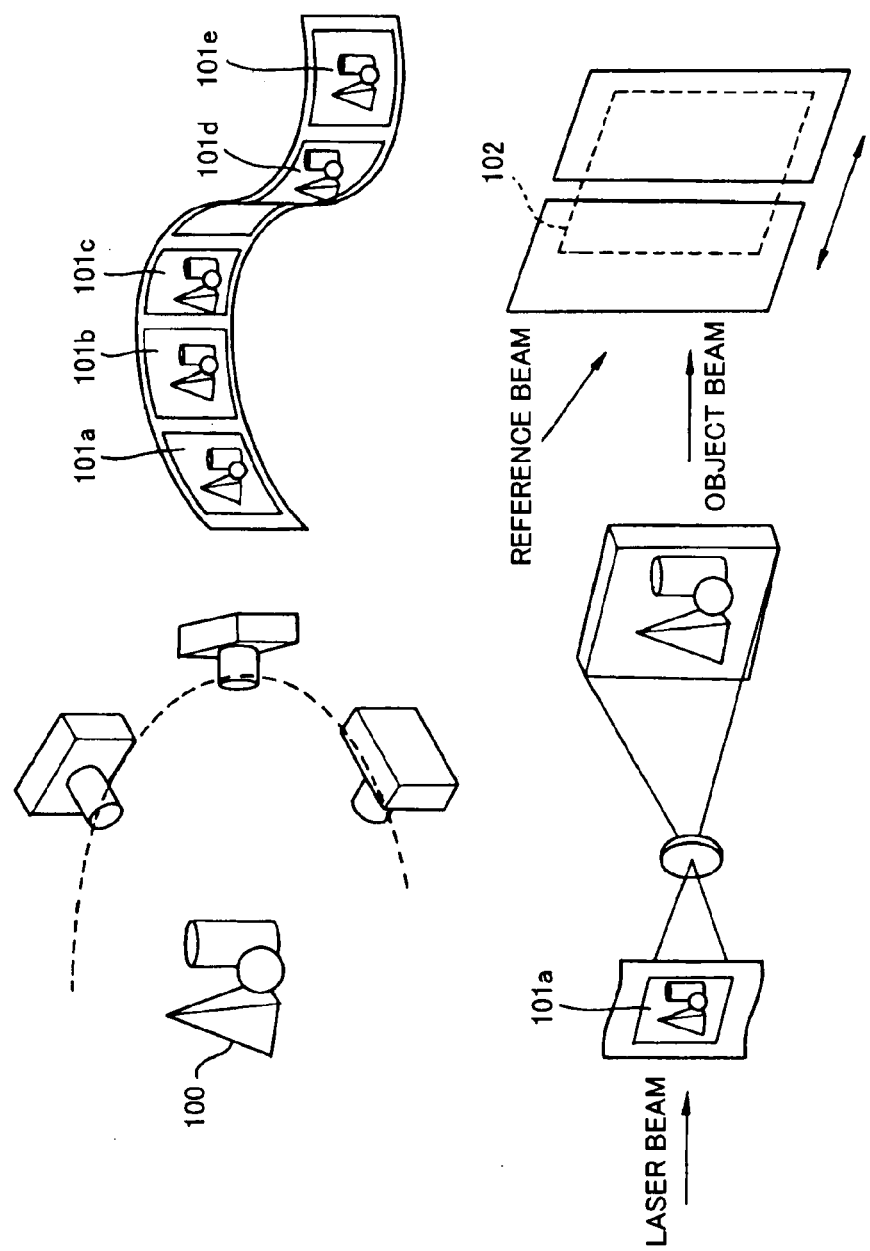
FIG. 14 is a schematic diagram showing a method of producing a holographic stereogram.

In FIG. 13, at step ST21, the hologram record medium 30 is placed at the initial position. Thereafter, a loop of the process for each elemental hologram starts (at step ST22). Thereafter, another loop of the process for each elemental prism of the prism sheet 46 starts (at step ST23). In the second loop of the process for each position of the prism sheet 46 from step ST23 to step ST26, a parallax image display process (at step ST24) and a shutter control process (at step ST25) are performed.

In the first loop of the process for each elemental hologram from step ST22 to step ST29, a hologram record medium 30 moving process (at step ST27) and a vibration attenuation waiting process (at step ST28) are performed along with the process from step ST23 to step ST26. Thereafter, a post-process is performed (at step ST30).

It should be understood by those skilled in the art that various modifications, combinations, sub-combinations and alternations may occur depending on design requirements and other factors insofar as they are within the scope of the appended claims or the equivalents thereof. For example, in the foregoing example, a prism sheet was described. Instead, an optical deflecting device such as a holographic diffracting device, a micro mirror device, or an acoustic device may be used as long as the thickness is much smaller than the recording width. In the foregoing example, a reflection type hologram was described. Instead, embodiments of the present invention can be applied to transmission type holograms and edge lit type holograms.

What is claimed is:

1. An image recording method of recording a holographic stereogram, comprising the steps of:
    disposing an optical deflecting device in proximity to a hologram recording medium when it is exposed with a stripe-shaped elemental hologram;
    deflecting either an object beam or a reference beam in a long side direction thereof through the optical deflecting device to expose the hologram recording medium; and
    multiply exposing the same portion of the hologram recording medium, at least two times, with different area portions of the image area of the stripe-shaped elemental hologram, each of the area portions having non-overlapping areas and having smaller areas than the stripe-shaped elemental hologram, at different deflection angles of the optical deflecting device to cause the stripe-shaped elemental hologram recorded on the hologram recording medium to have a plurality of parallaxes in a long side direction of the stripe-shaped elemental hologram.

2. The image recording method as set forth in claim 1, wherein the optical deflecting device is a prism sheet having a micro structure in a long side direction of the optical deflecting device, and
    wherein the same portion of the hologram recording medium is multiply exposed at least two times with different deflection angles of the prism sheet to cause the stripe-shaped elemental hologram recorded on the hologram recording medium to have the plurality of parallaxes in the long side direction of the stripe-shaped elemental hologram.

3. The image recording method as set forth in claim 2, wherein the prism sheet is disposed on an object beam side, and
    wherein the object beam enters from a surface of the prism sheet having the micro structure.

4. The image recording method as set forth in claim 2, wherein an optical function plate having a one-dimensional spreading function is provided in parallel with the prism sheet,
    wherein the optical function plate has a refracting micro structure that is finer than the micro structure of the prism sheet and is used on a front surface or a rear surface of the prism sheet.

5. The image recording method as set forth in claim 1, wherein the optical deflecting device is disposed on the object beam side.

6. The image recording method as set forth in claim 5, wherein an optical function device which spreads the object beam only in the long side direction by a predetermined angle is disposed between the optical deflecting device and the hologram record medium.

7. The image recording method as set forth in claim 6, wherein an image displayed by a spatial light modulation device has been deviated so as to correct an error of a projected image due to differences of distances between the optical device and the optical function device.

8. The image recording method as set forth in claim 1, wherein the optical deflecting device is disposed on the reference beam side.

9. The image recording method as set forth in claim 1, wherein after a region of the hologram record medium is exposed with one elemental hologram transmitted by the optical deflecting device at a particular deflection angle is exposed, the optical deflecting device is disposed at different deflection angle while the hologram record medium is not moved, and
    wherein after the same region is multiply exposed, the hologram record medium and an optical system are relatively moved until surface exposure is completed.

10. The image recording method as set forth in claim 1, wherein while the optical deflecting device is disposed at a particular deflection angle, whenever the hologram record medium is exposed with each elemental hologram, the hologram record medium and the optical system are relatively moved until the surface exposure is completed and then the optical deflecting device is disposed at each deflection angle until the multiple exposure is completed.

11. The image recording method as set forth in claim 1, wherein an image process is performed such that natural spatial effects are represented for different parallaxes of the plurality of parallaxes present in the long side direction of the stripe-shaped elemental hologram.

12. The image recording method as set forth in claim 1, wherein the long side direction of the stripe-shaped elemental hologram is a vertical direction.

13. The image recording method as set forth in claim 1, wherein a cylindrical lens focuses the object beam in a horizontal parallax direction and a prism sheet included in the optical deflecting device deflects the object beam in a vertical parallax direction.

14. The image recording method as set forth in claim 1, wherein the different area portions of the image area of the stripe-shaped elemental hologram are obtained by dividing a plurality of images, in a widthwise direction, into non-overlapping segments, and
    wherein concatenating the different area portions forms the stripe-shaped elemental hologram.

15. An image recording apparatus which records a holographic stereogram, comprising:
    an optical deflecting device including a spatial light modulation device, an anamorphic optical system having different aspect ratios, and an optical deflecting element having a plurality of refraction angles at which a beam is refracted in a long side direction thereof and being movable in parallel with a hologram recording medium, the optical deflecting device being disposed in proximity to the hologram recording medium when it is exposed with a stripe-shaped elemental hologram, the optical deflecting device deflecting either an object beam or a reference beam in a long side direction thereof to expose the hologram recording medium; and
    an exposure controller which multiply exposes the same portion of the hologram recording medium at least two times, with different area portions of the image area of the stripe-shaped elemental hologram, each of the area portions having non-overlapping areas and having smaller areas than the stripe-shaped elemental hologram, at different deflection angles of the optical deflecting device to cause the stripe-shaped elemental hologram recorded on the hologram recording medium to have a plurality of parallaxes in a long side direction of the stripe-shaped elemental hologram.

16. The image recording apparatus as set forth in claim 15, wherein after the exposure control section exposes a region of the hologram record medium with one elemental hologram transmitted by the optical deflecting device at a particular deflection angle is exposed, the exposure control section exposes the optical deflecting device at different deflection angle while the hologram record medium is not moved, and wherein after the exposure control section multiply exposes the same region, the exposure control section relatively moves the hologram record medium and an optical system until surface exposure is completed.

17. The image recording apparatus as set forth in claim 15, wherein while the exposure control section disposes the optical deflecting device at a particular deflection angle, whenever the exposure control section exposes the hologram record medium with each elemental hologram, the exposure control section relatively moves the hologram record medium and the optical system until the surface exposure is completed and then the exposure control section disposes the optical deflecting device at each deflection angle until the multiple exposure is completed.

18. An image recording medium on which a holographic stereogram is recorded, the holographic stereogram being produced by a method comprising the steps of:
  disposing an optical deflecting device in proximity to the image recording medium when it is exposed with a stripe-shaped elemental hologram;
  deflecting either an object beam or a reference beam in a long side direction thereof through the optical deflecting device to expose the image recording medium; and
  multiply exposing the same portion of the image recording medium at least two times, with different area portions of the image area of the stripe-shaped elemental hologram, each of the area portions having non-overlapping areas and having smaller areas than the stripe-shaped elemental hologram, at different deflection angles of the optical deflecting device to cause the stripe-shaped elemental hologram recorded on the image recording medium to have a plurality of parallaxes in a long side direction of the stripe-shaped elemental hologram.

* * * * *